United States Patent
Lu

(10) Patent No.: US 6,603,895 B2
(45) Date of Patent: Aug. 5, 2003

(54) DIRECT DRIVING TYPE OPTICAL FIBER SWITCH

(76) Inventor: Tom Lu, 4 Fl., No. 15, Mintzu 6th St., Shijr City, Taipei (TW)

( * ) Notice: Subject to any disclaimer, the term of this patent is extended or adjusted under 35 U.S.C. 154(b) by 0 days.

(21) Appl. No.: 09/935,648

(22) Filed: Aug. 24, 2001

(65) Prior Publication Data
US 2002/0025108 A1 Feb. 28, 2002

(30) Foreign Application Priority Data
Aug. 29, 2000 (TW) ........................................ 89117467 A

(51) Int. Cl.⁷ ............................... G02B 6/26; G02B 6/42
(52) U.S. Cl. .............................. 385/23; 385/16; 385/22
(58) Field of Search ............................. 385/20–23, 16, 385/17

(56) References Cited

U.S. PATENT DOCUMENTS

| | | | | |
|---|---|---|---|---|
| 4,189,206 A | * | 2/1980 | Terai et al. ............ | 250/229 |
| 4,452,507 A | * | 6/1984 | Winzer .................. | 385/21 |
| 4,911,520 A | * | 3/1990 | Lee ....................... | 156/158 |
| 5,175,776 A | * | 12/1992 | Lee ....................... | 385/16 |
| 5,434,936 A | | 7/1995 | Nagaoka et al. | |
| 6,002,819 A | * | 12/1999 | Saito et al. ........... | 385/22 |
| 6,118,910 A | * | 9/2000 | Chang .................. | 385/11 |
| 6,144,782 A | * | 11/2000 | Takahashi ............. | 385/20 |
| 6,169,827 B1 | * | 1/2001 | Holman et al. ....... | 385/16 |
| 6,266,461 B1 | * | 7/2001 | Takahashi ............. | 385/17 |
| 6,421,477 B1 | * | 7/2002 | Hane et al. ........... | 385/21 |

FOREIGN PATENT DOCUMENTS

JP  63-301918  * 12/1988  ............... 385/23

* cited by examiner

*Primary Examiner*—Brian Healy
*Assistant Examiner*—Dan Petkovsek
(74) *Attorney, Agent, or Firm*—Rosenberg, Klein & Lee

(57) ABSTRACT

A direct driving type optical switch is proposed. A row of V-grooves is formed on a base and a plurality of output optical fibers is arranged on one side of the base and respectively placed in the V-grooves. A movable input optical fiber is placed on another side of the base and atop a selected V-groove. The movable input optical fiber is pressed by a positioning block 446 and clamped tightly into the selected V-groove, whereby the input optical fiber is aligned with the output optical fiber in the selected V-groove for signal transmission.

23 Claims, 10 Drawing Sheets

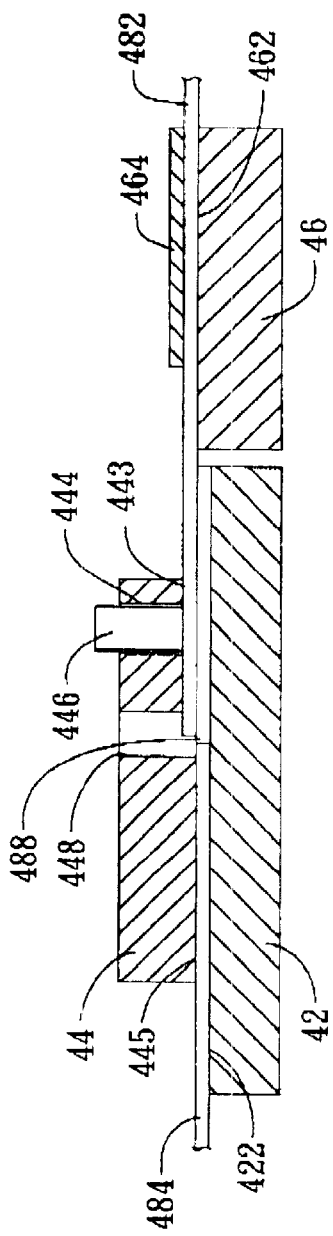
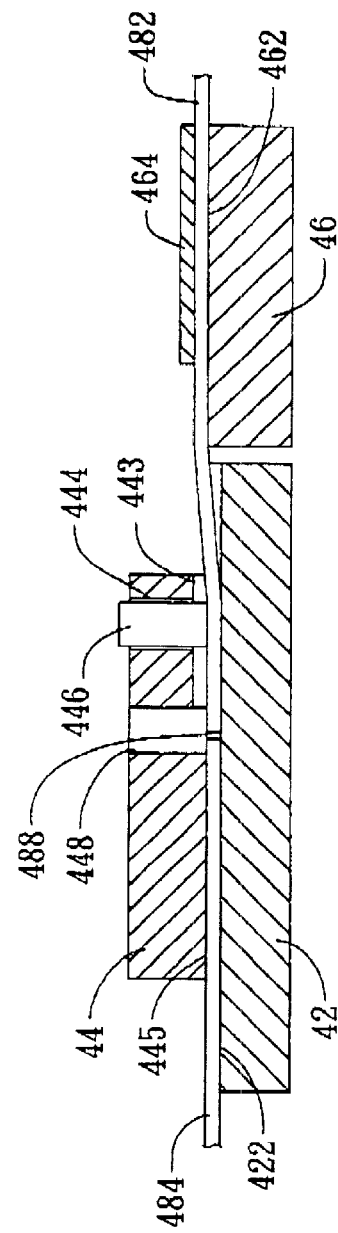

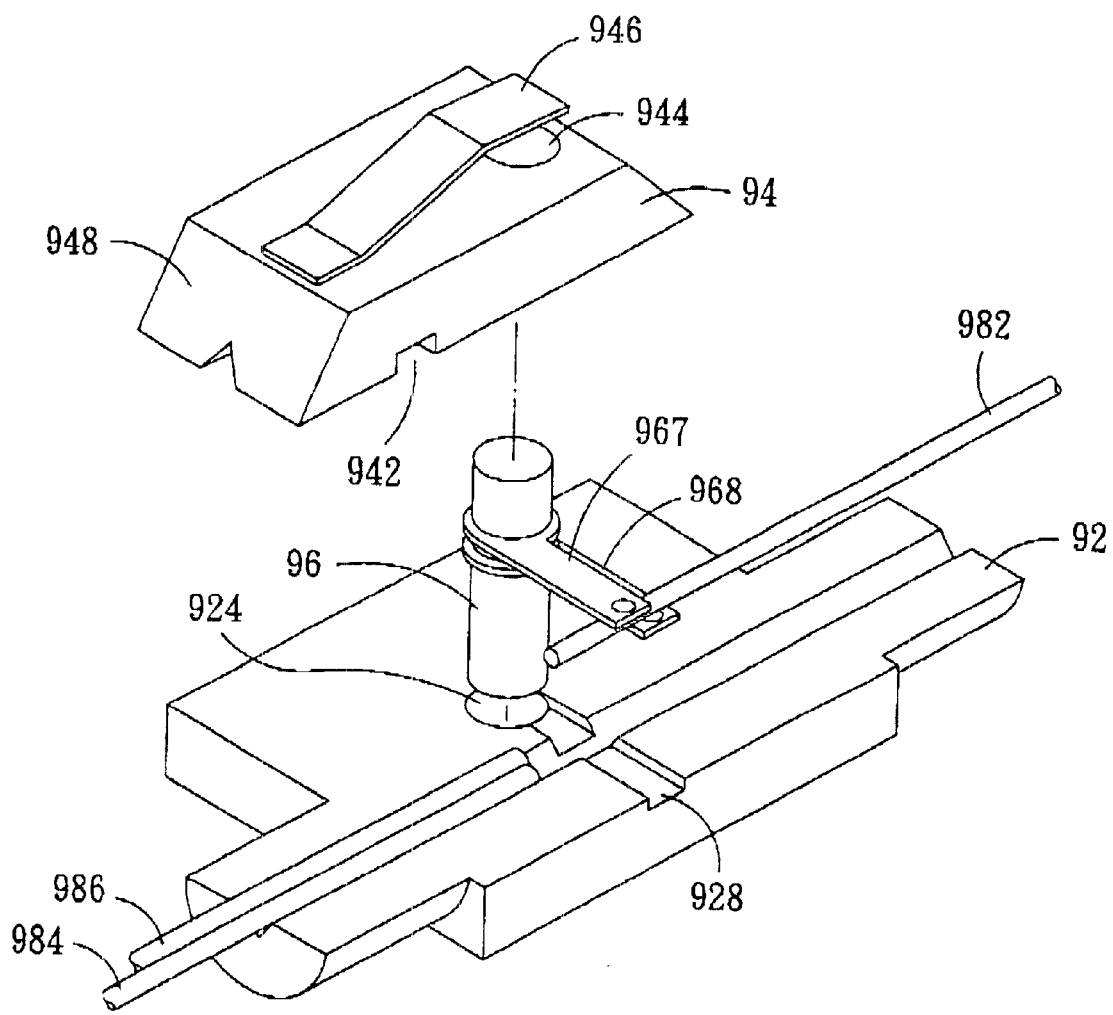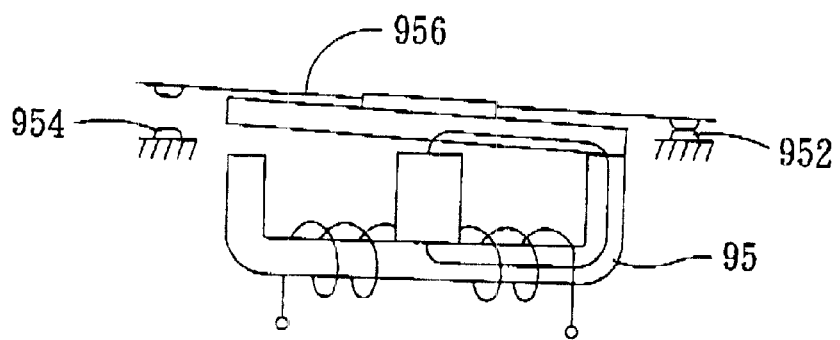
FIG. 9

DIRECT DRIVING TYPE OPTICAL FIBER SWITCH

FIELD OF THE INVENTION

The present invention relates to a direct driving type optical fiber switch, especially to a direct driving type optical fiber switch using V-groove to enhance alignment accuracy.

BACKGROUND OF THE INVENTION

There has always been a demand for increased capacity of transmission for information. The lightwave communication system using optical fiber provides an ideal solution for mass data transmission. More particularly, the optical fiber has advantages of low loss transmission over long distance, high security, immunity to EMI, and lightweight. Therefore, the conventionally fancy technology such as fiber to the curb (FTTC) and fiber to the building (FTTB), even fiber to the home (FTTH) and fiber to the desktop (FTTD) becomes mature and popular. The optical fiber switch is an important component for building optical network and therefore is under extensive research and improvement.

FIGS. 1A and 1B show a prior art optical switch disclosed in U.S. Pat. No. 5,434,936. The prior art optical switch comprises a movable optical fiber 101 with an end fixed to a tip of a cylindrical tube 103 and with another end extruding into a cylindrical sleeve 106. Two magnetic bodies 110a and 110b in a pipe shape arranged atop the input optical fiber 101. Solenoid coils 105a and 105b are provided so as to surround the two magnetic bodies 110a and 110b. A pair of permanent magnets 107a and 107b is located paralleled to the magnetic body 110a and at equivalent intervals, and having the magnetic poles in the opposite direction. A pair of permanent magnets 107c and 107d is located paralleled to the magnetic body 110b and at equivalent intervals, and having the magnetic poles in the opposite direction. There are four fixed optical fibers 102a, 102b, 102c and 102d, one of whose tips is opposite to a tip of the movable optical fiber 101, and which are fixed in a corner of a square hole within a columnar member 104 fixed within the cylindrical sleeve 106. arranged atop the input optical fiber 101. The magnetic fields of the solenoid coils 105a and 105b are attracted or repelled by those of the permanent magnets 107a, 107b, 107c and 107d, thus moving the movable optical fiber 101 to a selected corner of the square hole within a columnar member 104.

However, in above-mentioned optical switch, the switch of the movable optical fiber is achieved by the composite action of the solenoid coils and the permanent magnets. It is hard for the tip of the movable optical fiber to locate at a specific and accurate location. Therefore, considerable manual adjustment is required. The yield is reduced and the cost is increased.

Alternatively, the movable input optical fiber can be moved by a step motor. However, the positioning error for fiber alignment is required to be below ±0.5 $\mu$m. This imposes strict restriction for the accuracy of the step motor. Moreover, the maintenance and purchase costs are increased.

SUMMARY OF THE INVENTION

It is the object of the present invention to provide a direct driving type optical fiber switch with simple structure and reduced cost.

In one aspect of the present invention, the optical fiber switch uses V-groove to enhance alignment accuracy and uses at least one positioning block to clamp the movable input optical fiber into a selected V-groove.

In another aspect of the present invention, the optical fiber switch uses V-groove and positioning block to reduce alignment error and enhance yield.

In still another aspect of the present invention, the optical fiber switch uses V-groove and positioning block to reduce the accuracy requirement for each device, thus decreasing cost.

The various objects and advantages of the present invention will be more readily understood from the following detailed description when read in conjunction with the appended drawing, in which:

BRIEF DESCRIPTION OF DRAWING

FIG. 7A is a sectional view of the optical switch in FIG. 6, while the input optical fiber is raised above the V-grooves;

FIG. 7B is another sectional view of the optical switch in FIG. 6, while the input optical fiber is aligned to one of the output optical fibers;

FIG. 9 shows an exploded view of an optical switch according to still another preferred embodiment of the present invention.

DETAILED DESCRIPTION OF THE INVENTION

Figure 1A:
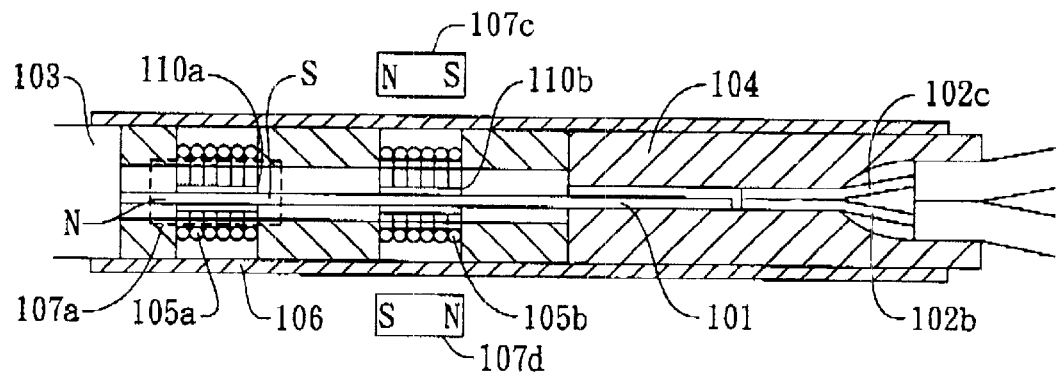
FIG. 1A shows a longitudinal sectional view of a prior art optical switch.
Figure 1B:
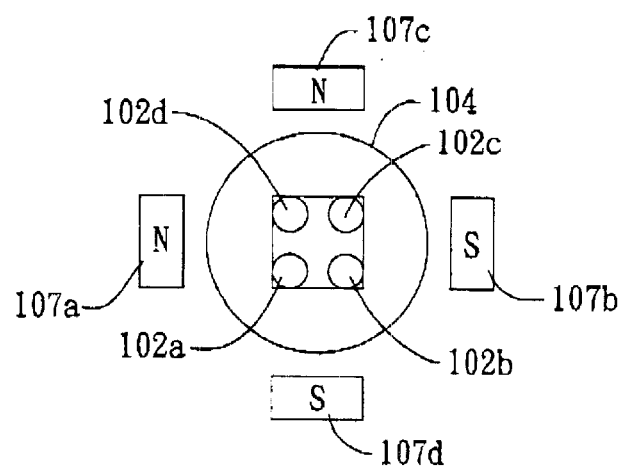
FIG. 1B shows a transverse sectional view of a prior art optical switch.
Figure 2:
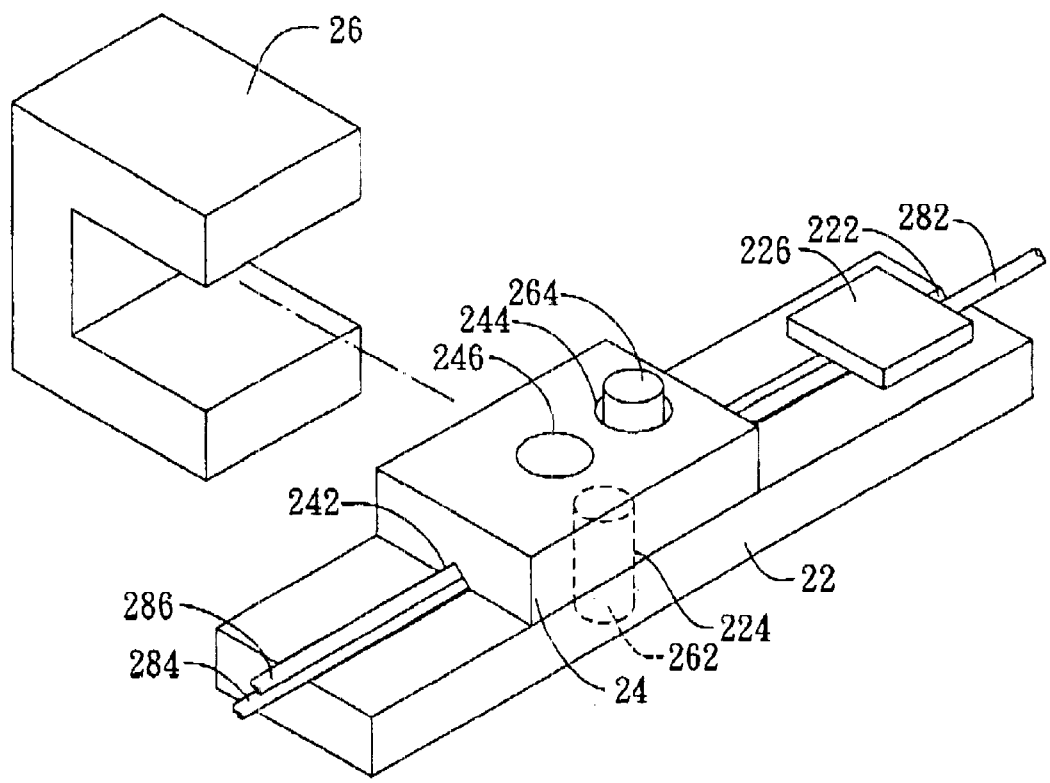
FIG. 2 shows a perspective view of an optical switch according to a preferred embodiment of the present invention.
Figure 3:
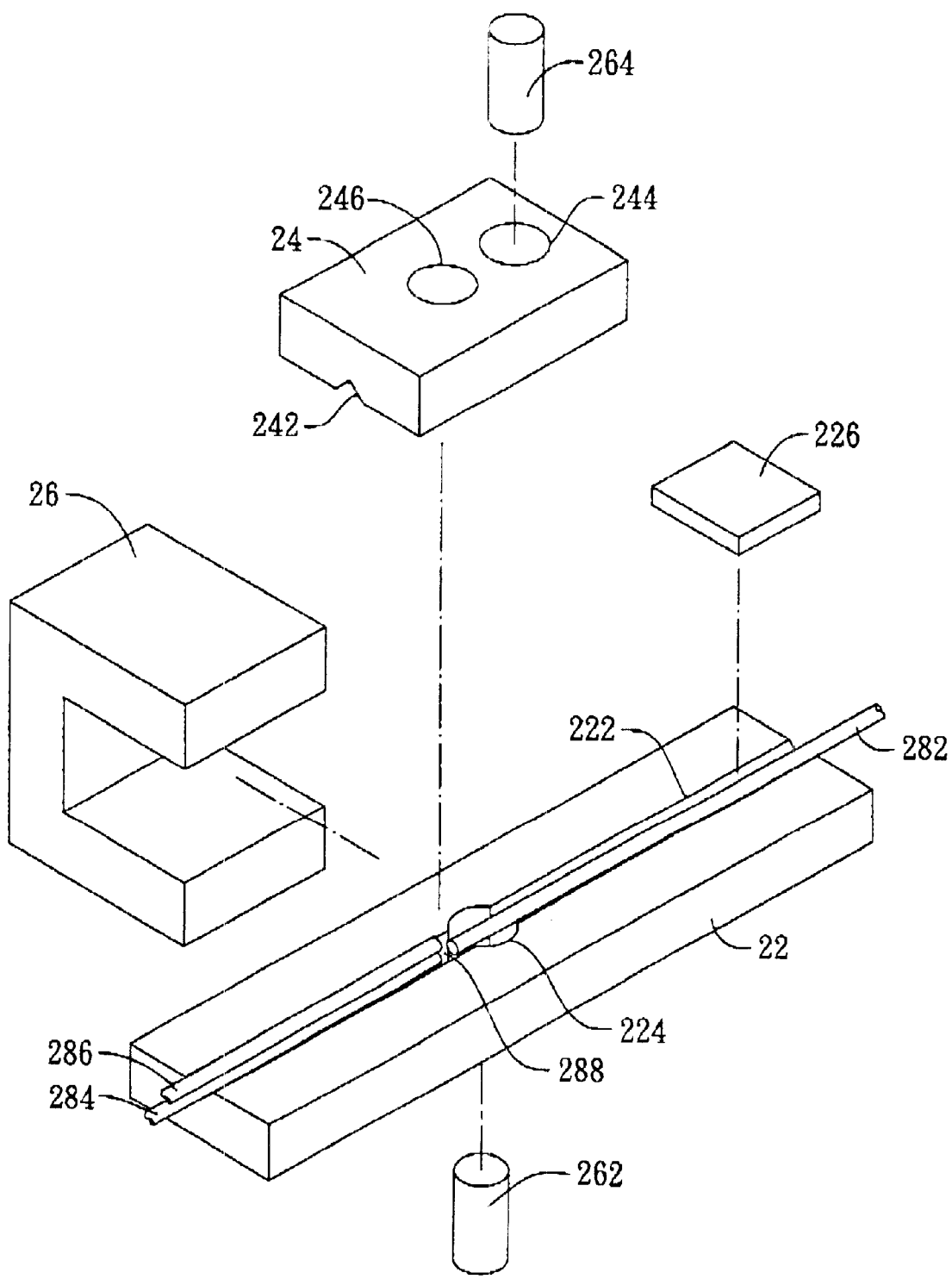
FIG. 3 shows an exploded view of the optical switch in FIG. 2.
Figure 4A:
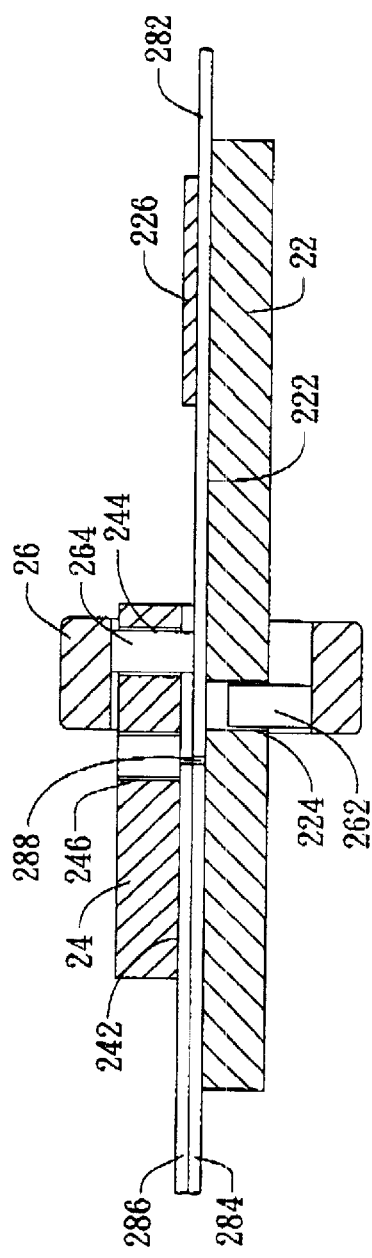
FIG. 4A is a sectional view of the optical switch in FIG. 2, while the input optical fiber is aligned to one of the output optical fibers.
Figure 4B:
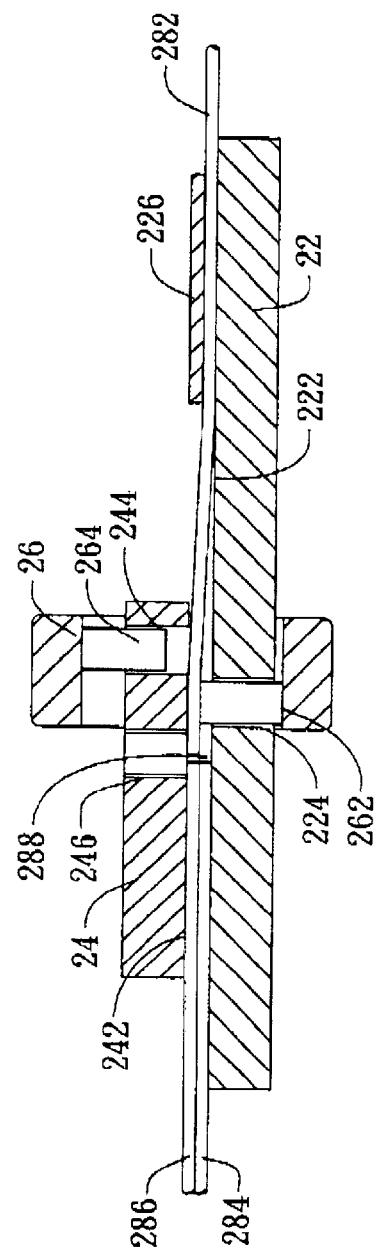
FIG. 4B is another sectional view of the optical switch in FIG. 2, while the input optical fiber is aligned to the other output optical fiber.

FIGS. 2, 3 and 4A, 4B shows the perspective view, exploded view and two sectional views of the present invention, respectively. The optical switch of the present invention comprises a base 22, an assembling stage 24, an input optical fiber 282 and two output optical fibers 284 and 286 arranged in stacked fashion, a pressing block 226, a positioning stage 26 and two positioning blocks 262 and 264. The base 22 has a V-groove 222 with a V-shaped cross section in a transverse direction. The input optical fiber 282 and the first output optical fiber 284 are placed at two opposite sides of the V-groove 222 and an alignment gap 288 is formed between the input optical fiber 282 and the first output optical fiber 284. A positioning hole 224 is formed on the V-groove 222 and vertically through the base 22. The positioning hole 224 is near a coupling end of the input optical fiber 282. The pressing block 226 is arranged atop the input optical fiber 282 to retain the input optical fiber 282. The assembling stage 24 has a V-groove 242 on bottom thereof and used to accommodate the second output optical fiber 286, whereby the two output optical fibers 284 and 286 are arranged in stacked fashion when the assembling stage 24 is assembled with the base 22. The assembling stage 24 also has a positioning hole 244 formed atop the input optical fiber 282 and an eyehole 246 atop the alignment gap 288 for observing alignment condition of fibers. The two positioning blocks 262 and 264 are engaged into the positioning holes 224 and 244, respectively, and abut to two inner walls of the positioning stage 26.

The positioning stage 26 is moved in up and down directions to push the two positioning blocks 262 and 264, respectively. As a result, the input optical fiber 282 is clamped to the V-groove 242 or the V-groove 222 by the positioning blocks 262 and 264 and is aligned to the output optical fiber 286 or the output optical fiber 284, respectively.

Figure 5:
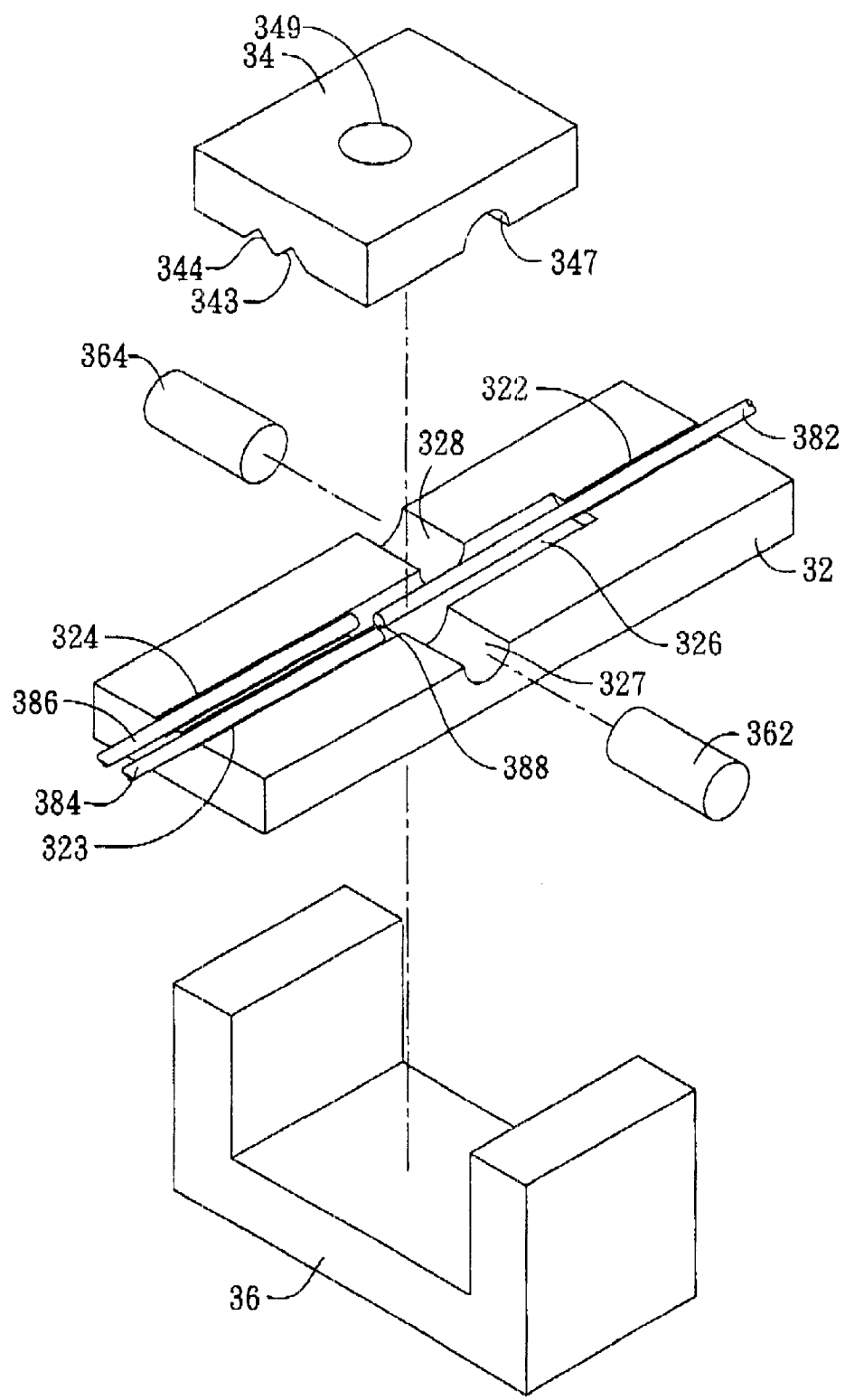
FIG. 5 shows an exploded view of an optical switch according to another preferred embodiment of the present invention.

FIG. 5 shows an exploded view of another preferred embodiment of the present invention. The optical switch according to this embodiment comprises a base 32, an input V-groove 322 on one end of the base 32, and two juxtaposed output V-grooves 323 and 324 on another end of the base 32. A dent 326 is formed between the input V-groove 322 and the output V-grooves 323, 324. The dent 326 has two lateral sides being linear extension of each outer bevel of the output V-grooves 323, 324. The dent 326 has two positioning grooves 327 and 328 on two lateral sides thereof, respectively. A first output optical fiber 384 and a second output optical fiber 386 are placed in the output V-grooves 323 and 324, respectively, with their coupling tips slightly extruding into the dent 326. An input optical fiber 382 is placed in the input V-groove 322 with its coupling tip extruding into the dent 326 and placed in proximity of the coupling tips of the two output optical fibers 384 and 386. Moreover, an alignment gap 388 is formed between the input optical fiber 382 and the two output optical fibers 384 and 386.

The optical switch according to this embodiment further comprises an assembling stage 34 atop the base 32. The assembling stage 34 has, on bottom thereof, an input V-groove (not shown), two output V-grooves 343 and 344, a dent (not shown), a positioning groove 347 and another positioning groove (not shown) with position corresponding to relevant parts of the base 32. Therefore, the assembling stage 34 and the base 32 together clamp the input optical fiber 382 and the two output optical fibers 384 and 386 in corresponding V-grooves, while the coupling tip of the input optical fiber 382 is movable in the dent 326. The assembling stage 34 further has an eyehole 349 atop the alignment gap 388 to observe alignment condition. The positioning grooves of the base 32 and the assembling stage 34 form two positioning holes after assembling of the base 32 and the assembling stage 34. Two positioning blocks 362 and 364 are engaged into the two positioning holes, respectively, and abut to two inner walls of a U-shaped positioning stage 36.

The positioning stage 36 is moved to push the two positioning blocks 362 and 364, respectively. As a result, the input optical fiber 382 is moved to be clamped to one of the new lateral V-grooves formed by the lateral sides of the dent 326 on the base and the lateral sides of the dent 326 on the assembling stage 34 after the assembling stage 34 assembled to the base 32, whereby the input optical fiber 282 is aligned to the output optical fibers 384 or to the output optical fiber 386 for switching optical signal.

Figure 6:
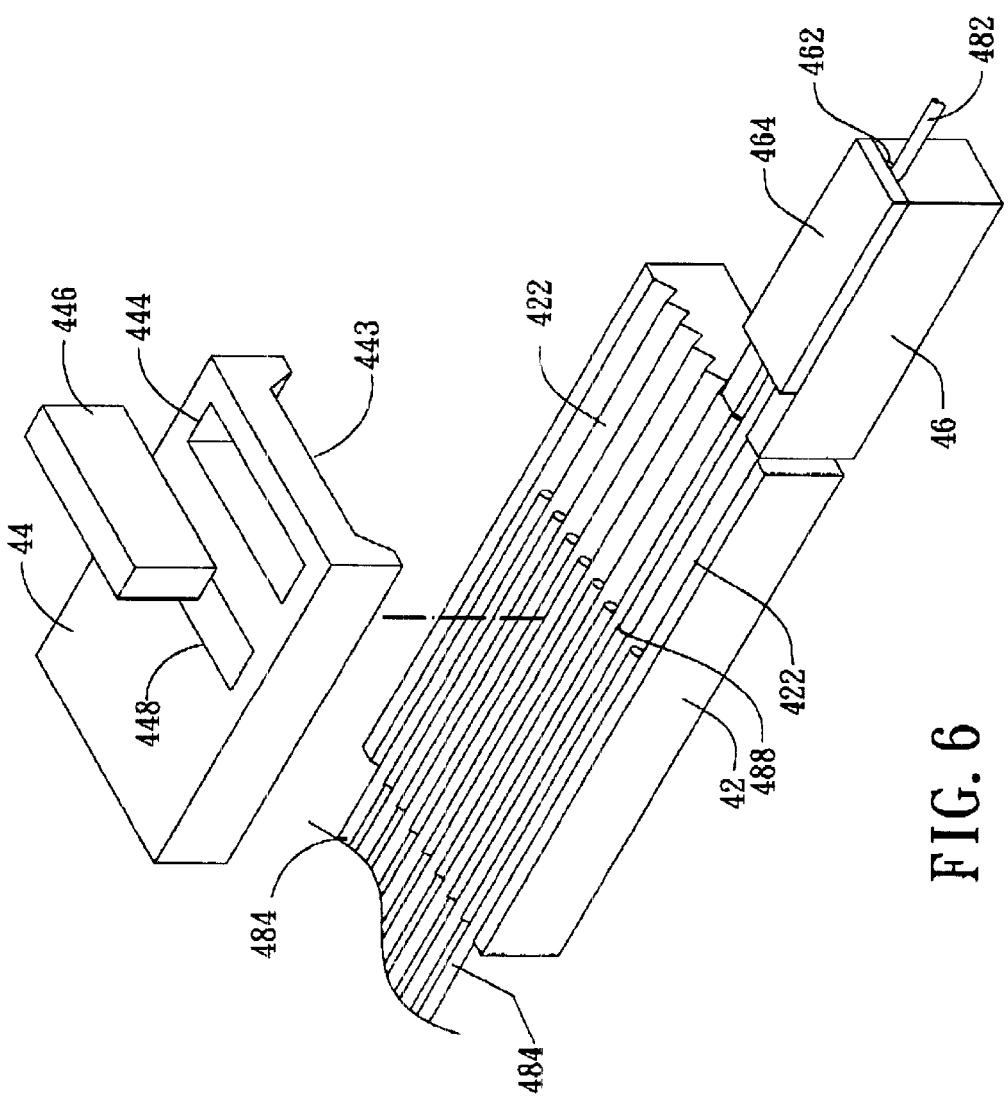
FIG. 6 shows an exploded view of an optical switch according to still another preferred embodiment of the present invention.

FIGS. 6, 7A and 7B shows still another preferred embodiment of the present invention. The optical switch according to this embodiment comprises a base 42, an assembling stage 44, an input stage 46 and a positioning block 446. A row of V-grooves 422 is formed on upper surface of the base 42 and adjacent to each other along a transverse direction. Each of the V-groove 422 accommodates an output optical fiber 484 on one end thereof. The assembling stage 44 has a row of V-grooves 445 on one bottom side thereof and corresponding to the row of V-grooves 422 on the base 42, and a dent 443 on another bottom side thereof. The dent 443 has larger depth than that of the V-groove 445 and a width covering total breadth of the row of the V-grooves 445. The assembling stage 44 has a positioning hole 444 atop the dent 443 and vertically through the assembling stage 44. The output optical fibers 484 are clamped in corresponding V-grooves 422 and 445 when the base 42 is assembled with the assembling stage 44.

The input stage 46 has a V-groove 462 for accommodating an input optical fiber 482 and a pressing block 464 is placed atop the input optical fiber 482 to enhance the positioning of the input optical fiber 482. The input optical fiber 482 has a coupling tip inserting into the dent 443 and placed in proximity of the output optical fibers 484 with an alignment gap 488 formed. Moving the input stage 46 moves the input optical fiber 482 laterally atop the V-grooves 422 on the base 42. Therefore, the input optical fiber 482 is moved atop one desired output optical fiber 484 and then the positioning block 446 is inserted through the positioning hole 444 to clamp tightly the input optical fiber 482, whereby the input optical fiber 482 is aligned with the desired output optical fiber 484. The assembling stage 44 further has an eyehole 448 atop the alignment gap 488 to observe alignment condition.

More particularly, in above preferred embodiment, a plurality of output optical fibers 484 are respectively placed in a row of V-grooves 422 on the base 42 and each occupies part of corresponding V-groove 422. The movable input optical fiber 482 is placed atop of another part of the V-groove 422. After the input optical fiber 482 is moved to a position corresponding to desired output optical fiber 484, the positioning block 446 is operated to clamp tightly the input optical fiber 482 into the V-groove 422, whereby the input optical fiber 482 is aligned with the desired output optical fiber 484.

In general the input stage 46 is moved by a servomotor or a step motor. With the help of the positioning block 446, which clamps tightly the input optical fiber 482 into the V-groove 422, the tolerance of the servomotor or a step motor is alleviated to ±20 μm instead of ±0.5 μm. Therefore, the manufacture cost and the maintenance cost are reduced.

Figure 8A:
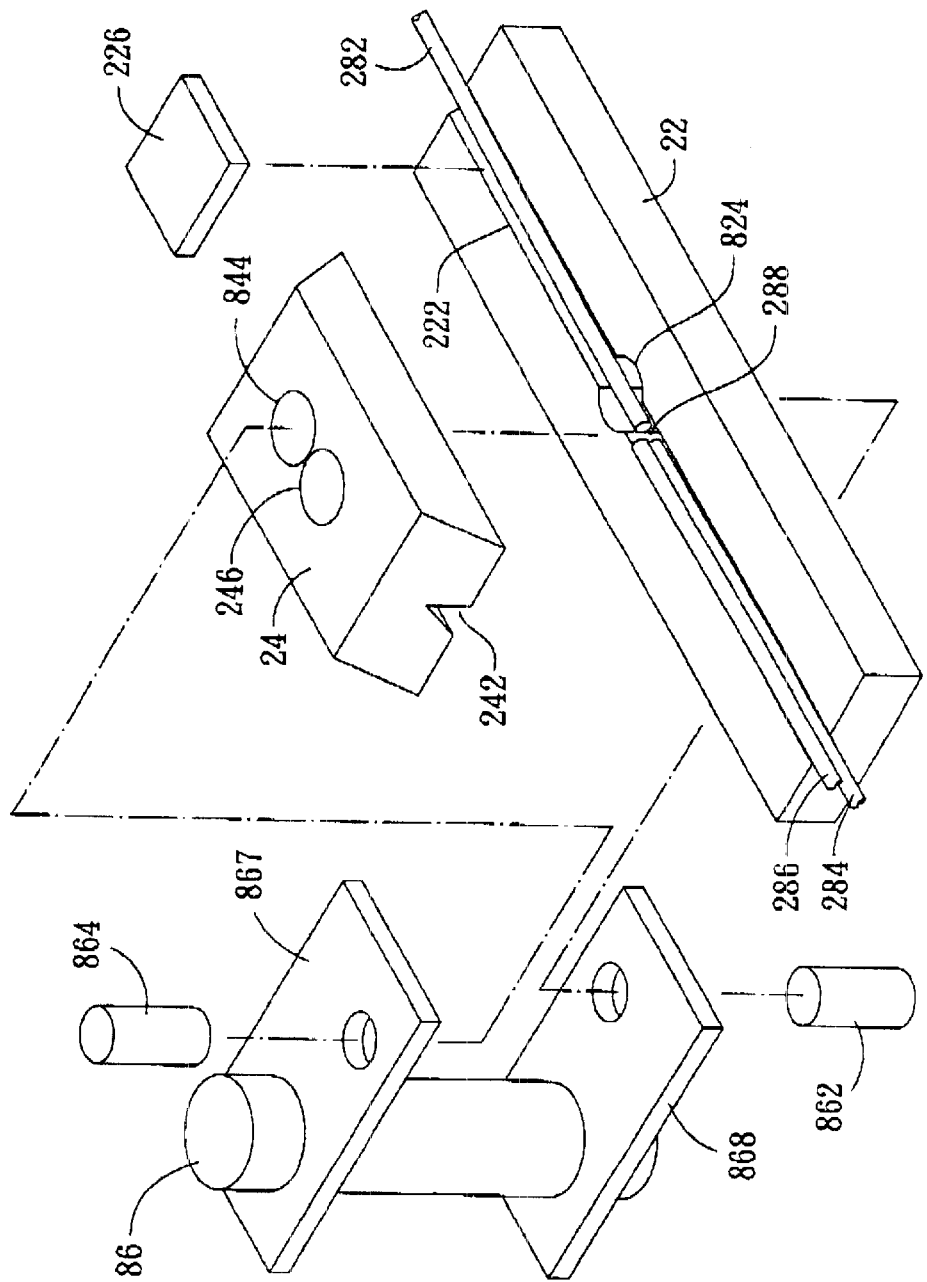
FIG. 8A shows an exploded view of an optical switch according to still another preferred embodiment of the present invention.
Figure 8B:
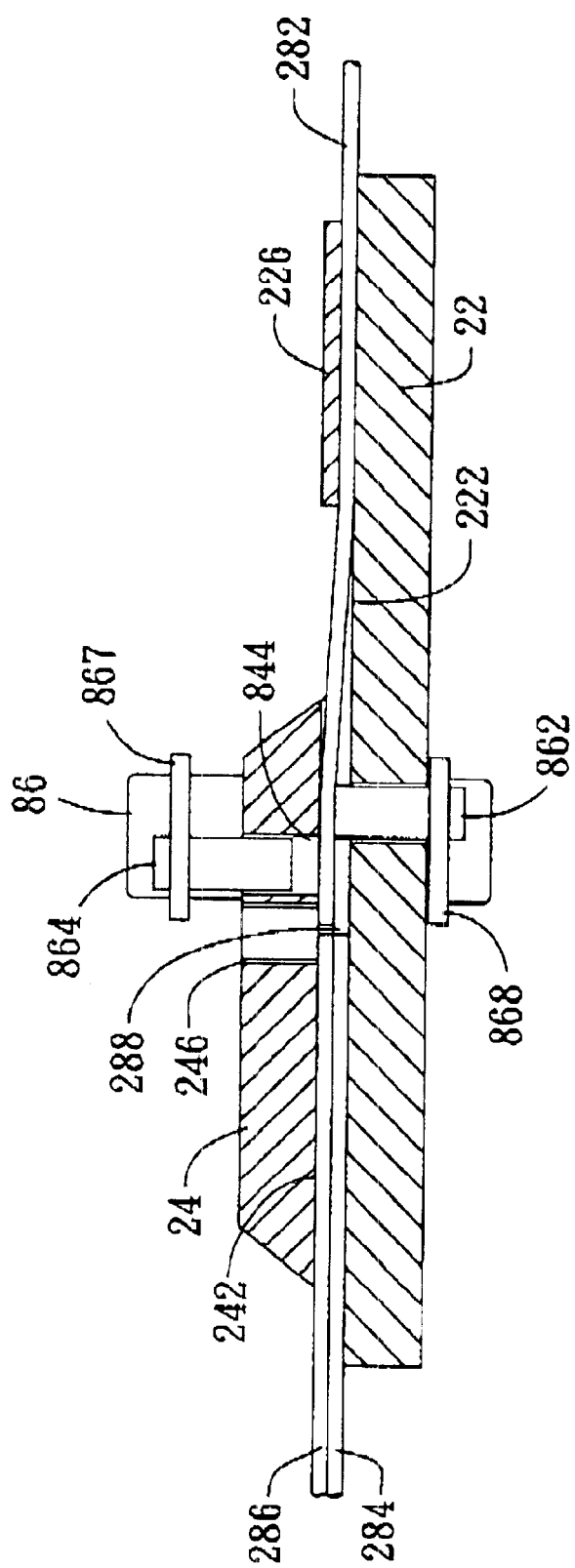
FIG. 8B is a sectional view of the optical switch in FIG. 8A.

FIGS. 8A and 8B shows still another preferred embodiment of the present invention. The optical switch according to this embodiment has similar components as those shown in FIG. 2. A positioning cylinder 86 and two linking plates 867, 868 replace the U-shaped positioning stage 26. By using the linking plates 867 and 868, the positioning cylinder 86 and positioning blocks 864, 862 are linked together. The cylinder 86 and the two linking plates 867, 868 have the advantages of easy manufacture. The positioning cylinder 86 is moved in up and down directions to drive the input optical fiber 282 through the two linking plates 867, 868 and positioning blocks 862, 864.

Moreover, as learned from experiment, the positioning block pushing the input optical fiber 282 away from horizontal position (the positioning block 862 in FIG. 8B) is preferably to have larger distance to the alignment gap 288 in comparison with another positioning block (the positioning block 864 in FIG. 8B). Therefore, the positioning block 864 has closer distance to the output optical fibers 286, 284, as being compared with the positioning block 862.

FIG. 9 shows an exploded view of still another preferred embodiment of the present invention. The optical switch according to this embodiment comprises a base 92, an assembling stage 94, an input optical fiber 982, two output optical fibers 984, 986 and a positioning cylinder 96. The positioning cylinder 96 is in contact with a pressing tongue 946 and an armature 956 of a relay 95. The positioning cylinder 96 is pushed by the pressing tongue 946 and the armature 956 of the relay 95 to move in up and down directions through a positioning hole 944 of the assembling stage 94 and a positioning hole 924 of the base 92. The armature 956 of the relay 95 pushes upward the positioning cylinder 96 to press against the pressing tongue 946 when one end of the armature 956 is close to one distal end 952 of the relay 95. On the contrary, the positioning cylinder 96 is not pushed by the armature 956 and is pressed downward by the pressing tongue 946 when one end of the armature 956 is close to one pressing end 954 of the relay 95.

The positioning cylinder 96 is provided with two positioning plates 967, 968, and is movable in a positioning groove 928 of the base 92 and a positioning groove 942 of the assembling stage 94, respectively. The two positioning plates 967 and 968 are in contact with the input optical fiber 982. So that when the positioning cylinder 96 move up and down, the two positioning plates would be driven up and down to switch the input optical fiber 982 for aligning with one of the output optical fibers 984 and 986.

The assembling stage 94 preferably has a bevel surface to facilitate the assembling with the base 92. The pressing tongue 946 can be replaced by another relay. Moreover, if the pressing tongue 946 is fixed at other location than that shown in FIG. 9, an eyehole (not shown) can be provided on the assembling stage 94 for observing the alignment condition of the fiber. In above-mentioned preferred embodiments, the positioning stage or positioning cylinder can be moved by mechanical force. Alternatively, the positioning stage or positioning cylinder can be made of magnetic material and driven by electromagnetic force.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications should be intended be and embraced within the scope of the invention as defined in the appended claims.

What is claimed is:

1. An optical fiber switch, comprising:
a base having a V-groove formed on an upper surface thereof and a positioning hole formed at a predetermined location on said V-groove and vertically through said base;
an input optical fiber arranged in said V-groove at one end thereof and atop said positioning hole, a distal end of said input optical fiber having a movable tip;
a first output optical fiber arranged in said V-groove at an end thereof opposing said input optical fiber and separated therefrom by an alignment gap, said first output optical fiber being coaxial with said input optical fiber;
an assembling stage arranged atop said base and having a V-groove formed on a bottom surface thereof, said V-groove being longitudinally aligned with said V-groove of said base;
a second output optical fiber arranged in said V-groove of said assembling stage such that said second output optical fiber is stacked on said first output optical fiber when said assembling stage is assembled with said base; and
at least one positioning block slidably received in said positioning hole for positioning said movable tip of said input optical fiber in one of said V-groove of said base and said V-groove of said assembling stage, whereby said input optical fiber is aligned with one of said first output optical fiber and said second output optical fiber, respectively, an upper surface of each of said at least one positioning block abutting said bottom surface of said assembling stage when said input optical fiber is positioned in said V-groove of said assembling stage so as to prevent deformation of said input optical fiber.

2. The optical fiber switch as in claim 1, further comprising a pressing block atop said base and used to retain said input optical fiber.

3. The optical fiber switch as in claim 1, further comprising an eyehole formed on said assembling stage and atop said alignment gap, thus facilitating observation of fiber alignment.

4. The optical fiber switch as in claim 1, further comprising a positioning hole formed on said assembling stage and corresponding in position to said tip of said input optical fiber, another positioning block being slidably received in said positioning hole of said assembling stage, said positioning block in said assembling stage being moved with said positioning block in said base to ensure precise alignment of said input optical fiber to one of said first and said second output optical fibers.

5. The optical fiber switch as in claim 4, further comprising a U-shaped positioning stage with two inner walls on which said positioning block in said assembling stage and said at least one positioning block in said base abut to ensure simultaneous movement thereof.

6. The optical fiber switch as in claim 5, wherein said positioning stage is driven by mechanical force.

7. The optical fiber switch as in claim 5, wherein said positioning stage is of magnetic material and driven by electromagnetic force.

8. An optical fiber switch comprising:
a base having an input V-groove on a first end thereof, two juxtaposed output V-grooves on a second end thereof, each of said output V-grooves having an outer bevel proximate an outer edge of said base and an inner bevel opposing said outer bevel, a cavity formed between said input V-groove and said output V-grooves, said cavity having two longitudinal sides including linear extensions of each of said outer bevels of said output V-grooves, and two positioning grooves vertically formed on two longitudinal sides thereof;
an input optical fiber placed in said input V-groove, said input optical fiber having a movable tip at a distal end thereof, said movable tip extending into said cavity;
a first output optical fiber and a second output optical fiber placed in each of said output V-grooves, respectively;
an assembling stage atop said base and having on a bottom surface thereof an input V-groove, two output V-grooves, a cavity, and two positioning grooves corresponding in position to said input V-groove, said two output V-grooves, said cavity and said two positioning grooves of said base, respectively, said V-grooves of said base and said assembling stage clamping said input optical fiber and said two output optical fibers therein when said base is assembled with said assembling stage, said cavity forming a space in which said tip of said input optical fiber is movable, said longitudinal sides of said cavity on said base and longitudinal sides of said cavity on said assembling stage form two longitudinal V-grooves on each side of said cavity after said assembling stage is mated to said base, said positioning grooves of said base and said assembling stage forming two positioning holes after mating said base to said assembling stage; and two positioning blocks slidably received in said two positioning holes, respectively, said two positioning blocks positioning said movable tip of said input optical fiber in one of said longitudinal V-grooves of said cavity, whereby said input optical fiber is aligned to one of said two output optical fibers and an upper surface of each of said positioning blocks abuts said longitudinal sides of said cavity when said input optical fiber is positioned in one of said longitudinal V-grooves of said cavity so as to prevent deformation of said input optical fiber.

9. The optical fiber switch as in claim 8, further comprising an eyehole formed on said assembling stage and atop an alignment gap between said input optical fiber and said output optical fibers, thus facilitating observation of fiber alignment.

10. The optical fiber switch as in claim 8, further comprising a U-shaped positioning stage with two inner walls on which said positioning blocks in said assembling stage and said positioning block in said base abut to ensure simultaneous movement thereof.

11. The optical fiber switch as in claim 8, wherein said positioning stage is driven by mechanical force.

12. The optical fiber switch as in claim 8, wherein said positioning stage is of magnetic material and driven by electromagnetic force.

13. An optical fiber switch comprising:

a base having a V-groove formed on an upper surface thereof and a positioning hole formed at a predetermined location on said V-groove and vertically through said base;

an input optical fiber arranged in said V-groove at one end thereof and atop said positioning hole, a distal end of said input optical fiber having a movable tip;

a first output optical fiber arranged in said V-groove at an end thereof opposing said input optical fiber and separated therefrom by an alignment gap, said first output optical fiber being coaxial with said input optical fiber;

an assembling stage arranged atop said base and having a V-groove formed on a bottom surface thereof, said V-groove being longitudinally aligned with said V-groove of said base, said V-groove of said assembling stage having a positioning hole formed at a predetermined location thereof and vertically through said assembling stage;

a second output optical fiber arranged in said V-groove of said assembling stage such that said second output optical fiber is stacked on said first output optical fiber when said assembling stage is assembled with said base; and at least one positioning cylinder having an upper linking plate and a lower linking plate perpendicularly extending from a top portion and a bottom portion thereof, respectively, said upper and lower linking plates being respectively connected to upper and lower positioning blocks slidably received in said positioning hole of said assembling stage and said positioning hole of said base, respectively, for positioning said movable tip of said input optical fiber in one of said V-groove of said base and said V-groove of said assembling stage, whereby said input optical fiber is aligned with one of said first output optical fiber and said second output optical fiber, respectively, an upper surface of said lower positioning block abutting said bottom surface of said assembling stage when said input optical fiber is positioned in said V-groove of said assembling stage and a lower surface of said upper positioning block abutting said upper surface of said base when said input optical fiber is positioned in said V-groove of said base so as to prevent deformation of said input optical fiber.

14. The optical fiber switch as in claim 13, further comprising an eyehole formed on said assembling stage and atop said alignment gap, thus facilitating observation of fiber alignment.

15. The optical fiber switch as in claim 13, wherein one of said upper and lower positioning blocks is located a greater distance from said alignment gap than the other one of said upper and lower positioning blocks.

16. The optical fiber switch as in claim 13, wherein said positioning cylinder is driven by an external force exerted by one of a relay, a mechanical device, an electromagnetic device and a combination thereof.

17. An optical fiber switch comprising:

a base having a V-groove formed on an upper surface thereof and a positioning hole formed at a predetermined location on said V-groove and vertically through said base;

an input optical fiber arranged in said V-groove at one end thereof opposing said input optical fiber and atop said positioning hole, a distal end of said input optical fiber having a movable tip;

a first output optical fiber arranged in said V-groove at an end thereof opposing said input optical fiber and separated therefrom by an alignment gap, said first output optical fiber being coaxial with said input optical fiber;

an assembling stage arranged atop said base and having a V-groove formed on a bottom surface thereof, said V-groove being longitudinally aligned with said V-groove of said base, said V-groove of said assembling stage having a positioning hole formed at a predetermined location thereof;

a second output optical fiber arranged in said V-groove of said assembling stage such that said second output optical fiber is stacked on said first output optical fiber when said assembling stage is assembled with said base; and at least one positioning cylinder received in both said positioning hole of said base and said positioning hole of said assembling stage, said at least one positioning cylinder having two positioning plates whereon an external force is applied through said positioning cylinder for positioning said input optical fiber in one of said V-groove of said base and said V-groove of said assembling stage so as to align said input optical fiber to one of said first output optical fiber and said second output optical fiber, respectively for preventing deformation of said input optical fiber.

18. The optical fiber switch as in claim 17, wherein said base has a relay on a bottom surface thereof, said relay having an armature to provide said external force.

19. The optical fiber switch as in claim 18, wherein said positioning hole of said assembling stage passes through said assembling stage and a pressing tongue is provided atop said assembling stage and in contact with said positioning cylinder.

20. The optical fiber switch as in claim 17, wherein said positioning hole of said assembling stage passes through said assembling stage and a relay is provided atop said assembling stage and in contact with said positioning cylinder to provide said external force.

21. The optical fiber switch as in claim 17, further comprising an eyehole formed on said assembling stage and atop an alignment gap between said input optical fiber and said output optical fibers, thus facilitating observation of fiber alignment.

22. The optical fiber switch as in claim 17, wherein one of said positioning plates is located a greater distance from said alignment gap than the other one of said positioning plates.

23. The optical fiber switch as in claim 17, wherein each of said base and said assembling stage has a positioning groove corresponding in position to said positioning plate, said positioning plate being movable in said positioning groove.

* * * * *